3,429,820
POWER STEERING PROCESS AND LUBRICATING
COMPOSITION
Joseph F. Lyons, Poughkeepsie, and Jackson W. Wisner, Jr., and Paul R. Thomas, Wappingers Falls, N.Y., assignors to Texaco Inc., New York, N.Y., a corporation of Delaware
No Drawing. Continuation-in-part of application Ser. No. 280,719, May 15, 1963. This application June 6, 1966, Ser. No. 555,261
U.S. Cl. 252—78   6 Claims
Int. Cl. C10m 1/24

ABSTRACT OF THE DISCLOSURE

Method for operating a power steering unit using a lubricating oil containing an estolide of 12-hydroxystearic acid having a neutralization number of less than 30 and a compounded hydraulic fluid containing as estolide of 12-hydroxystearic acid having a neutralization number from 10 to 30.

---

This application is a continuation-in-part of application Ser. No. 280,719, filed on May 15, 1963.

This invention relates to a method for operating a power steering unit and to a hydraulic fluid adapted for use in a power steering unit.

In general, a power steering unit consists of a piston and power-reacting means. An external force acting on the piston puts the power steering unit into operation by exerting pressure on the hydraulic fluid which activates the power-reacting means in direct control of the steering.

Heretofore, power steering units have been operated successfully on the same hydraulic fluids used in automatic transmissions, brake clutches, planetary gears and hydraulic control mechanisms. Increasing demands of the various lubrication applications have resulted in more specifically formulated products with the result that the lubricants have become less satisfactory or unsuitable for certain purposes. For example, automatic transmission fluids in the past have also served satisfactorily in power steering units. More recently, however the requirements of power steering units have become so severe that the standard automatic transmission fluids have insufficient lubricity and cause squealing when the power steering mechanism is actuated and the mechanism put under stress. This squealing is believed to be due to the higher pressures under which the hydraulic fluid is worked in current production power steering units.

Besides the more stringent anti-squeal requirements for power steering service, a power steering fluid has to meet many other standards for a hydraulic fluid, including storage stability, anti-wear properties and relative insensitiveness to water. In addition, the power steering fluid must be compatible with hydraulic fluids already in service, such as automatic transmission fluids, without any substantial reduction or loss of its properties for power steering service.

In accordance with the present invention, a method for operating a power steering unit in conjunction with a novel power steering fluid having excellent anti-squeal properties as well as stability during storage and use, anti-wear properties and relatives insensitiveness to water have been discovered. The method depends on supplying to and operating the power steering unit on the power steering fluid. The power steering fluid comprises at least 92 weight percent of a mineral lubricating oil and 0.5 to 5 weight percent of an oil-soluble estolide of a hydroxystearic acid. More specifically, the power steering fluid comprises a mineral lubricating oil and 0.5 to 5 weight percent of an estolide of 12-hydroxystearic acid which has been prepared by autoesterification of the hydroxystearic acid until the estolide reaction product has a neutralization number less than 30. This neutralization value of the estolide is important since power steering fluids prepared from estolides having a neutralization number greater than 30 have been found to be unstable and to form precipitates in use or on standing resulting in a commercially unacceptable product.

The mineral lubricating oil which constitutes at least 92 weight percent of the composition is a refined oil or a mixture of refined oils selected according to the viscosity requirements of the power steering service. For power steering service, the oil should have an SUS viscosity of the compounded oil at 210° F. of between 49 and 59 and at 0° F. of 25,000 maximum. The base oil or a major component thereof is generally a distillate oil lighter than SAE 30 grade motor oil, such as one having an SUS viscosity at 100° F. less than 500 and generally between 400 and 450. This base oil or major component thereof can be prepared from a mineral oil distillate by acid treating. The flash point of the major component of the base oil is substantially above 400° F. and may be considerably higher.

A particularly preferred base oil composition comprises approximately 70–90 percent of a light distillate oil of the type described in the previous paragraph and 10 to 30 percent of a naphthene base distillate which imparts improved pour and lubricating properties to the distillate fraction. An effective base oil mixture comprises 80 percent of an acid treated paraffinic base distillate having an SUS at 100° F. of 400 to 450, a flash above 450° minimum, a pour below 15° F. and 20 percent of a naphthene base distillate which has been acid treated and has an SUS viscosity at 100° F. of 60, a flash of about 300° F. and a pour of about minus 60° F. The resulting base oil has a flash above 375° F. and a pour substantially below 15° F. and an SUS viscosity at 100° F. of 270.

The oil-soluble estolide of hydroxystearic acid which imparts improved anti-squeal properties to the power steering hydraulic fluids has the following general formula:

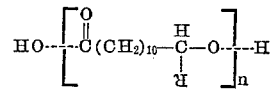

wherein R is an alkyl group of 6 carbon atoms. The estolide is prepared by heating 12-hydroxystearic acid at an elevated temperature for sufficient time to produce an estolide product having a neutralization number less than 30 and preferably from 10 to 25. More specifically, this product is prepared by heating 12-hydrostearic acid at a temperature of 300–350° F. for at least about 25 hours and preferably for 30 to 60 hours. The estolide product has a molecular weight in the range of 1700 to 3400 and $n$ in the formula is an integer from 6 to 12. Preferably the estolide has a molecular weight in the range from about 1800 to 2800.

The neutralization value of the estolide product is critical in the power steering fluid of the invention. Estolides having a neutralization number less than 30 are completely oil-soluble and produce a hydraulic fluid which is stable, relatively insensitive to water, has markedly improved anti-squeal properties, and imparts other desired properties to the finished power steering fluid. In contrast, power steering hydraulic fluids prepared from estolides having neutralization numbers above 30 are unstable and form precipitates on standing or in use resulting in an unmarketable product.

It is understood that conventional additives for hydraulic fluids may be incorporated in the power steering fluid of the invention to enhance the viscosity, pour, corrosion, nonfoaming and other properties normally desired in a power steering fluid. Additives effective for these and other purposes include the "Acryloids," alkylated phenols, alkyl and/or aryl phosphates and silicone polymers.

Viscosity index improvement of the estolide-containing power steering fluid is effected with a methacrylate ester polymer or co-polymer having the formula:

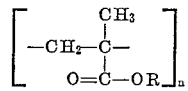

wherein R is an alkyl group or a mixture of alkyl groups containing from 1 to 20 carbon atoms and $n$ is a number providing a molecular weight of the polymer above 25,000. Various methacrylate ester polymers of this type are known which possess pour depressant and viscosity index improving properties. A very satisfactory material is a copolymer of the lower $C_4$–$C_{18}$ alkyl methacrylate esters. A commercial methacrylate copolymer of this type which is primarily a viscosity index improver is "Acryloid 618" by Rohm and Haas wherein R comprises about 50 percent butyl and 50 percent stearyl groups, the copolymer having a molecular weight above 50,000.

The commercial methacrylate polymers and copolymers are sold in the form of a 20 to 40 percent concentrate of the active polymer in a light colored mineral lubricating oil base providing a clear amber colored viscous liquid having a kinematic viscosity at 210° F. of about 600–850 centistokes. In the following description, the polymer will be listed on an oil free basis except where the trade names of commercial products are specified.

One or more of the methacrylate ester polymers as described above may be employed in a proportion of about 0.2 to 3 percent by weight, preferably from about 0.3 to 1.0 weight percent based on the power steering fluid composition in order to impart the desired viscosity index and pour point. Acryloid 618 is particularly effective either alone or in admixture with other acryloids.

An antioxidant is employed in the power steering fluid to enhance the stability of the fluid. A suitable class of anti-oxidants are the monoalkyl- and polyalkylphenols in which the alkyl radical has from 1 to 10 carbon atoms, such as 2,3-, 2,6- and 3,5-diamyl phenol, 2,4-di-methyl-6-tertiary butyl phenol and 2,6-ditertiary butyl-4-methyl phenol. A particularly preferred anti-oxidant is a mixture of alkylphenols consisting of 2,6-ditertiary butyl phenol, 2,4,6-tritertiary butyl phenol and orthotertiary butyl phenol which is commercially available under the name "Anti-oxidant 733" through the Ethyl Corporation. The anti-oxidant is employed in the finished power steering fluid in an amount from about 0.05–0.5 weight percent with the preferred amount being about 0.2 weight percent.

The anti-wear property of the power steering fluid is enhanced with selected additives. An effective class of anti-wear additives are the phosphate esters and, more particularly, the alkyl, aryl, alkaryl or aralkyl phosphate esters, in which the hydrocarbyl radical has from 3 to 24 carbon atoms, such as tricresyl phosphate, tri-(2-ethylhexyl) phosphate, di-lauryl phosphate, tri-amyl phosphate, di-(tridecyl) phosphate, triphenyl phosphate and monocresyl diphenyl phosphate.

Other anti-wear additives which can be employed are the sulfur-containing organic compounds, particularly the dithiophosphate salts, sulfurized olefins, neutralized sulfurized olefins and mixtures thereof. Dithiophosphate salts are prepared by the reaction of alcohols or phenols with phosphorus pentasulfide and subsequent neutralization of the acidic reaction product with a divalent metal hydroxide or carbonate. Sulfurized olefins are obtained by the reaction of olefins including olefinic pentasulfide and terpenes with sulfur, hydrogen sulfide, or hydrous pentasulfide; the neutral modifications result from oxidation or reaction with caustic of the foregoing reaction products.

Dithiophosphate metal salts, particularly zinc and calcium salts, are produced by the reaction of the metal oxide, or metal, per se, with alkyl thiophosphates resulting from the reaction of monohydroxy alcohols with phosphorus pentasulfide. It is believed that the major reaction product has the following composition:

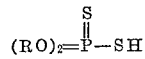

wherein R designates the radical of the alcohol used in the reaction. The salts are formed from the phosphorus pentasulfide alcohol condensation products by reaction with an excess of powdered divalent metal, metal oxide or hydroxide at a temperature in the range of 200–350° F. Preferred alcohols for the reaction with phosphorus pentasulfide are methyl isobutyl carbinol, isopropyl alcohol, lauryl alcohol, cyclohexanol, methyl cyclohexanol and capryl alcohol. The zinc salts of alkyl thiophosphates formed by reaction of $P_2S_5$ with one of the aforementioned alcohols have proven to be particularly excellent anti-wear additives in power steering fluids. The anti-wear additive is generally employed in a concentration of 0.05 to 0.75 weight percent of the power steering fluid with the preferred amount being from about 0.25 to 0.60 weight percent.

The power steering fluid optionally includes a suitable anti-foam agent since hydraulic fluids are circulated rapidly in operation and may entrap air. For this purpose, silicone polymers of high viscosity, such as dimethyl silicone polymer having a kinematic viscosity at 77° F. of about 100,000 centistokes and above is preferably employed. This agent also increases the flash point of the fluid. The silicone polymer is usually employed in the form of a concentrate in a hydrocarbon solvent such as kerosene. A very satisfactory anti-foam agent for this purpose is prepared by diluting 10 grams of a dimethyl silicone polymer with kerosene to bring the volume to 100 cubic centimeters. A proportion in the order of 0.005 to 0.25 percent by weight of the immediately foregoing concentrate is ordinarily employed, an amount sufficient to provide about 50–250 parts per million of the silicone polymer concentrate in the power steering fluid.

Example I

The method of operating a power steering unit and the novel power steering fluid of the invention are illustrated in this example. Two power steering fluids were prepared from a base fluid comprising 80 volume percent of an acid-treated paraffin base distillate and 20 volume percent of a naphthene base distillate. The paraffin base distillate had an SUS viscosity at 100° F. of 400 to 450 and the naphthene base distillate had an SUS viscosity at 100° F. of 55 to 65. The compositions of the power steering fluids in weight percent were as follows:

| | Fluids A and B |
|---|---|
| Base oil | 96.5 |
| Acryloid 618 | 1.7 |
| Estolide of 12-hydroxystearic acid | 1.3 |
| 2,6-ditertiary butyl phenol, 2,4,6-tritertiary butyl phenol and orthotertiary butyl phenol mixture | 0.2 |
| Tricresyl phosphate | 0.3 |
| Kerosene concentrate containing 10 g. dimethyl silicone per 100 cc. of solution, p.p.m. | 100 |

The above two power steering fluids were identical except in one respect. The fluid designated Power Steering Fluid A contained an estolide of 12-hydroxystearic acid having a neutralization number of 37. The other fluid designated Power Steering Fluid B contained an estolide of 12-hydroxystearic acid having a neutralization number of 24.

The foregoing fluids were tested in the Saginaw Squealing Pump Test in addition to the usual tests of the properties essential in a power steering fluid. The Saginaw Squealing Pump Test is particularly designed to test the performance of a power steering fluid at varying pressures under working conditions comparable to power steering service. The Saginaw Squealing Pump Test involves the use of a specially selected power steering pump which squeals with an automatic transmission fluid commonly used in power steering units. The pump is run at 465 r.p.m. and temperatures of 210° F., 230° F. and 250° F. At each temperature, the working pressure of the pump is raised from zero to a pressure at which a loud, high-pitched is produced. The pressure is then lowered until the squeal disappears and quiet operation is regained. A bypass valve opens at a pressure of 1100 p.s.i.

A commercially successful automatic transmission fluid widely used in power steering units, designated Fluid C, was compared to the above fluids in the Saginaw Squealing Pump Test and other tests, the results of which follow:

|  | Fluid A | Fluid B | Fluid C |
|---|---|---|---|
| Viscosity: | | | |
| SUS at 100° F | 343 | 328 | 208 |
| SUS at 210° F | 58.1 | 57.1 | 52.1 |
| Flash Point, COC, °F | 405 | 405 | 375 |
| Viscosity Index | 115 | 115 | 140 |
| Aniline Point, °F | 215 | 215 | 202 |
| Four Ball Wear Test (1 hr./40 kg./200° F./1,800 r.p.m.) scar dia., mm | 0.53 | 0.51 | 0.58 |
| Stick-Slip Test, Coeff. of Friction, 90 lb. load: | | | |
| Static | .10 | .12 | .17 |
| Kinematic | .11 | .12 | .19 |
| GM Heat Test (250° F./125 hr.): | | | |
| Evaporation | 2.5 | 2.9 | 1.9 |
| Sludge | (1) | (1) | (1) |
| Storage, one month: | | | |
| Cold Room, 30-35° F | (2) | (3) | (3) |
| Room Temperature | (4) | (3) | (3) |
| Saginaw Squealing Pump Test, p.s.i.: | | | |
| 200° F | (5) | (5) | 400 |
| 210° F | (5) | (5) | |
| 230° F | (5) | (5) | |
| 250° F | (5) | (5) | |

[1] None.
[2] Slightly hazy, no sediments.
[3] Clear, no sediment.
[4] Slightly hazy, 1/8" sediment.
[5] No squeal at 1,100.

It is evident from the tests that the method and the power steering fluids containing an estolide of 12-hydroxystearic acid are effective as evidenced by the excellent anti-squeal properties in the Saginaw Squealing Pump Test at temperatures of 250° F. under 1100 p.s.i. without squealing. In contrast, the commercial automatic transmission lubricant caused squealing in the same test at a temperature of 200° F. and 400 p.s.i.

However, of the two power steering fluids containing the estolide of 12-hydroxystearic acid, only Fluid B in which the estolide had a neutralization number less than 30 was stable. Fluid A, which produced a very substantial precipitate on standing was unstable and commercially unacceptable.

Obviously, many modifications and variations of the invention, as hereinbefore set forth, may be made without departing from the spirit and scope thereof, and therefore only such limitations should be imposed as are indicated in the appended claims.

We claim:

1. A method for operating a power steering unit having a piston and force-reacting means which comprises supplying to said power steering unit a hydraulic lubricating oil comprising at least 92 weight percent of a mineral lubricating oil and from about 0.5 to 5 weight percent of an estolide of 12-hydroxystearic acid having a neutralization number less than 30.

2. A method according to claim 1 in which said estolide has a neutralization number in the range of 10 to 25.

3. A method according to claim 1 in which said mineral lubricating oil consists of a light distillate oil having an SUS viscosity at 210° F. in the range of 49 to 59.

4. A method according to claim 1 in which said estolide has a molecular weight in the range of 1700 to 3400.

5. A hydraulic fluid adapted for power steering service comprising about 96.5 weight percent of a mineral lubricating oil, said mineral lubricating oil comprising about 70 to 90 percent of a light distillate oil having an SUS viscosity at 210° F. between 49 and 59, and 10 to 30 percent of a naphthene base distillate having an SUS viscosity at 100° F. from 400 to 450, 0.5 to 5 weight percent of an estolide of 12-hydroxystearic acid having a neutralization number in the range of 10 to 25, about 0.2 to 3 weight percent of a methacrylate ester polymer, 0.05 to 0.5 weight percent of a mixture of tertiary butylphenols, 0.05 to 0.75 weight percent of tricresyl phosphate and an effective amount of anti-foam silicone polymer concentrate.

6. A hydraulic fluid according to claim 5 in which said estolide of 12-hydroxystearic acid has a molecular weight in the range of 1800 to 2800 and a neutralization value of about 10.

References Cited

UNITED STATES PATENTS 2,147,647  2/1939  Gleason _____ 252—56
2,528,348  10/1950  Denison et al. _____ 252—78 X
2,913,415  11/1959  Schmitz _____ 252—78

LEON D. ROSDOL, *Primary Examiner.*

STANLEY D. SCHWARTZ, *Assistant Examiner.*

U.S. Cl. X.R.

252—56, 79, 75